July 25, 1961

A. H. GOREY 2,993,423

SHUTTER FOR PHOTOGRAPHIC CAMERAS

Filed Oct. 30, 1959

INVENTOR.
ARCHIE H. GOREY

BY *B. M. Schlesinger*
Attorney

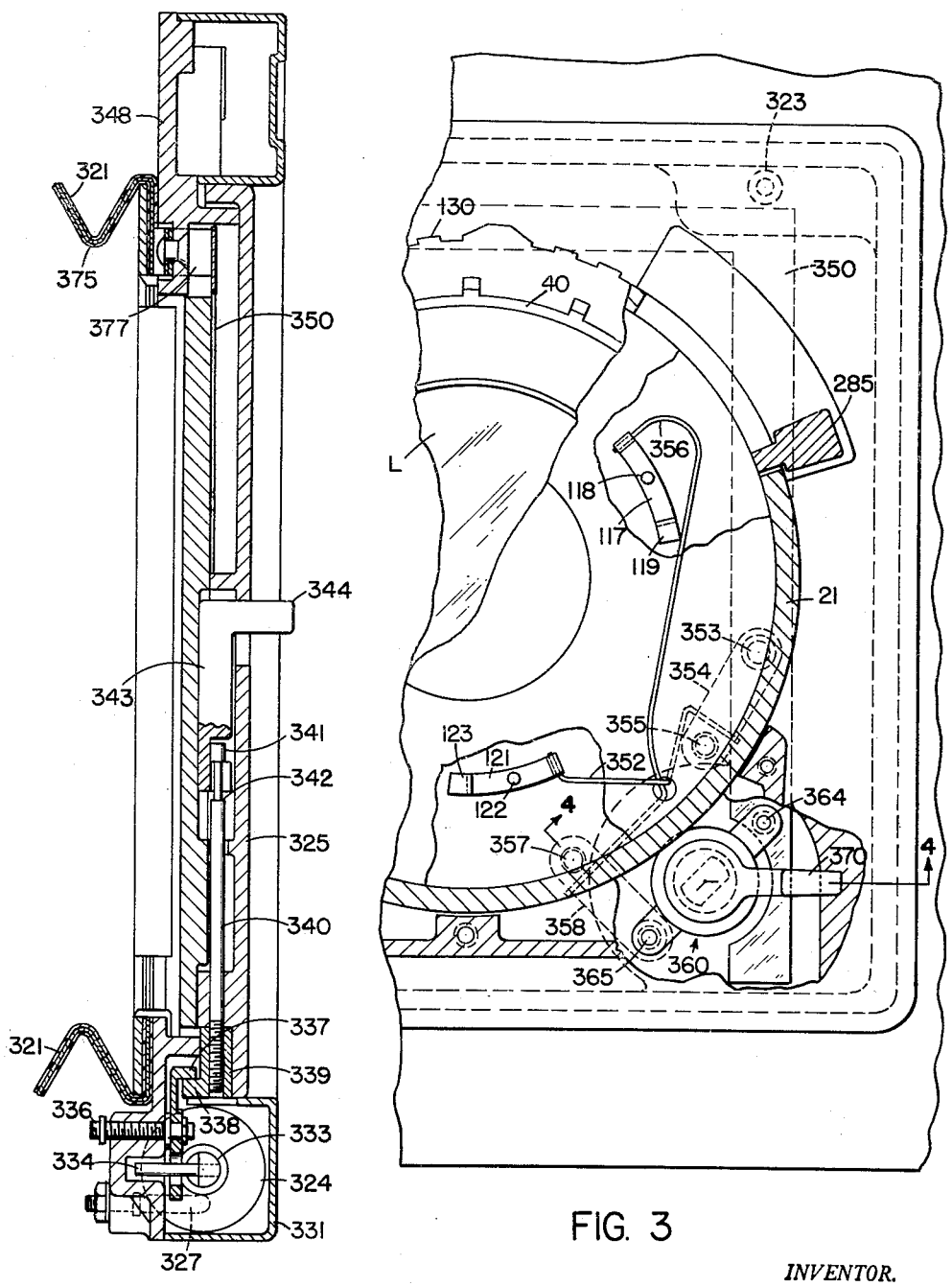

July 25, 1961    A. H. GOREY    2,993,423
SHUTTER FOR PHOTOGRAPHIC CAMERAS
Filed Oct. 30, 1959    4 Sheets-Sheet 3

INVENTOR.
ARCHIE H. GOREY
BY
Attorney

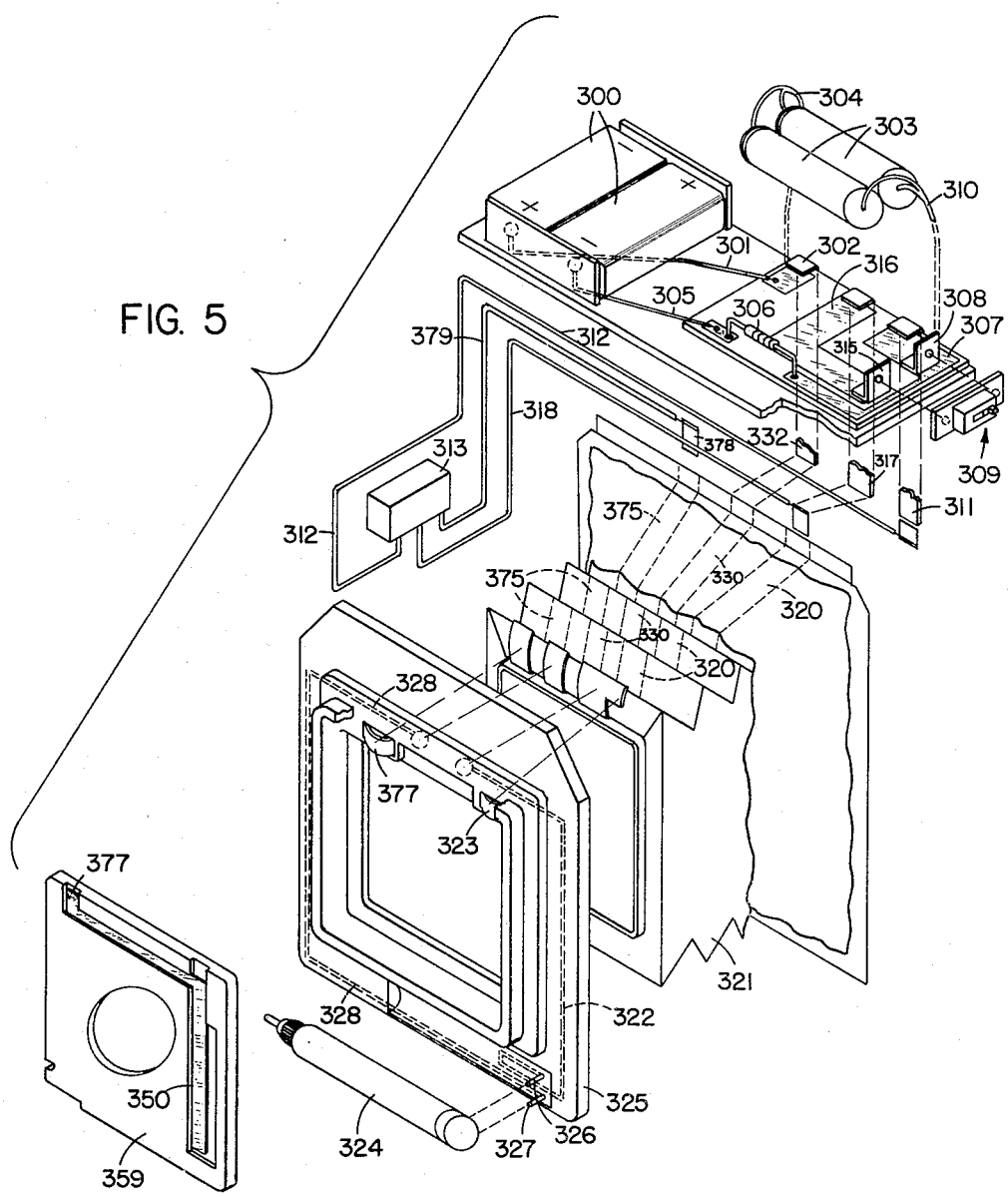

United States Patent Office 2,993,423
Patented July 25, 1961

2,993,423
SHUTTER FOR PHOTOGRAPHIC CAMERAS
Archie H. Gorey, Rochester, N.Y., assignor to Graflex, Inc., Rochester, N.Y., a corporation of Delaware
Filed Oct. 30, 1959, Ser. No. 849,828
4 Claims. (Cl. 95—11.5)

The present invention relates to photoflash synchronizing mechanism for photographic cameras, and more particularly to a camera having a between-the-lens shutter and to a flash synchronizing mechanism for such a shutter. In a more specific aspect, the invention constitutes an improvement on the between-the-lens shutter and flash synchronizing apparatus disclosed in my U.S. Patent No. 2,895,391, granted July 21, 1959.

There are a wide variety of flash lamps available today. Photoflash lamps of some types have a long peak of maximum illumination. Other lamps, such as the gaseous type, have a very short peak; they are very fast. Regardless of the type of flash lamp employed, however, it is desirable to time the shutter opening to the peak illumination obtainable with the lamp.

In the between-the-lens shutter of Patent No. 2,895,391 above-mentioned, there are three electrical terminals or contact posts for the plugs that connect with the flash lamps. The center post and one of the outside posts are used when a so-called "M" type flash lamp is employed. Such a lamp has a long peak of illumination. The center post and the other outside post are used when "F" or "X" lamps are used which have a short period of peak illumination. With this construction the connections to the flash lamp extend outside of the camera, and the posts project from the shutter.

One object of the invention is to provide a between-the-lens shutter with a flash synchronizing mechanism which is selectively connectable to different types of flash lamps, and which will be more compact, and of better appearance than prior such shutters.

Another object of the present invention is to provide a shutter mechanism which will eliminate the necessity for plugging into the shutter itself a connection for a flash lamp.

Another object of the invention is to provide a between-the-lens shutter having means for connecting it to different types of flash lamps for flash synchronization where the connection extends through the shutter, and through the camera on which the shutter is mounted, so that the connections are concealed, and cord connections, that extend outside of the shutter and the camera, are eliminated.

A still further object of the invention is to provide an improved between-the-lens shutter, which can be used selectively with different types of flash lamps, and which is so constructed that the selected flash lamp will be tripped automatically in proper synchronism with the shutter opening.

Other objects of the invention will be apparent hereinafter from the specification and from the recital of the appended claims when read in conjunction with the accompanying drawings:

FIG. 2 is a fragmentary section taken on the line 2—2 of FIG. 1 looking in the direction of the arrows;

FIG. 3 is a fragmentary front elevation of the camera broken away in a plane parallel to the plane of FIG. 1, further to illustrate the invention;

FIG. 5 is an exploded view of a camera constructed according to the present invention and showing fragmentarily and somewhat diagrammatically the electrical circuit of the camera.

Figure 1:
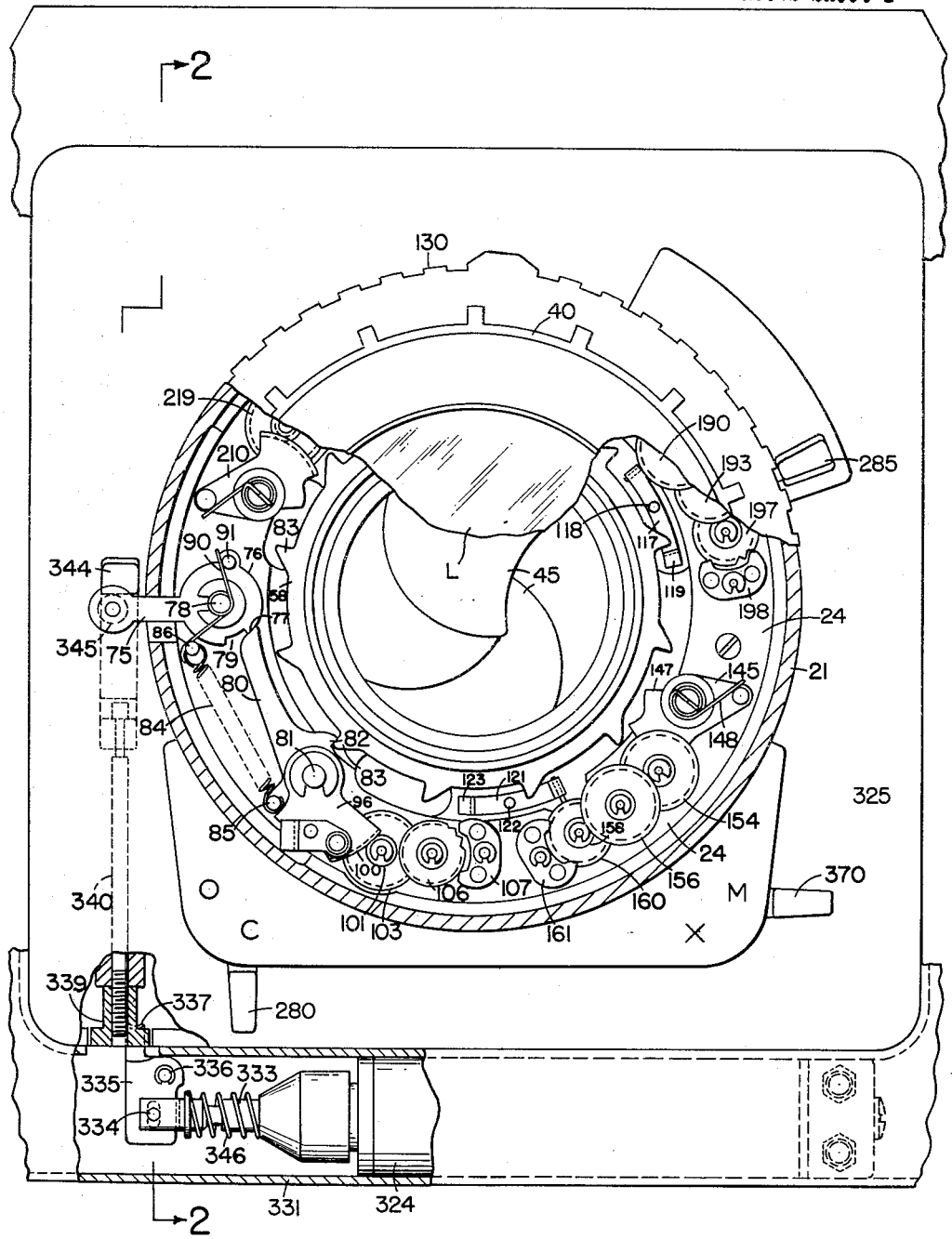
FIG. 1 is a fragmentary front elevation, with parts broken away, of a camera having mounted thereon a between-the-lens shutter constructed according to one embodiment of this invention.

Referring now to the drawings by numerals of reference, 21 denotes the cylindrical body or housing for the shutter mechanism and for the lens elements. The structure is similar to that described in my Patent No. 2,895,391, and reference may be had to that patent for a further description thereof. Parts of the present shutter, which are identical with parts of the shutter disclosed in my prior Patent No. 2,895,391, are identified herein by the same reference numerals as employed to identify such parts in Patent No. 2,895,391. Parts herein disclosed, which are different from those disclosed in my Patent No. 2,895,391 are identified by the numerals 300 and up.

The shutter of the present invention may be provided, as in the shutter of my prior patent, with four shutter leaves 45 (FIG. 1). These are designed so that they overlap when in closed position to prevent passage of light from the forward lens element L of the shutter to the rear lens element (not shown) and to the sensitive medium (not shown) which is to be exposed in the camera. The shutter is tripped by a trigger 75.

The shutter is held in cocked position until the trigger is tripped by a lever 80, which is pivotally mounted upon a shaft 81 in the casing, and which has a shoulder portion 82 adapted to engage successively with the teeth 83, of the toothed ring 58. Toothed ring 58, as described in Patent No. 2,895,391 is integral with a master gear. A wind-up member is connected to the master gear by springs, which are wound-up by rotation of the wind-up member, to cock the shutter. When the trigger is released these springs drive the toothed ring and the master gear. The master gear is geared to eccentrics on which the shutter leaves are mounted, so that as the master gear and the toothed ring or sprocket member run down, the shutter is successively opened and closed.

The lever 80 is constantly urged toward locking position, to hold the shutter cocked, by a coil spring 84, one end of which is secured to a pin 85 that is fastened to the tail of the lever, and the other end of which is secured to a pin 86 that is fastened in the mechanism plate 24 of the camera. The lever is held in locking position by the trigger 75. The trigger 75 has an arcuate peripheral surface 76 with which the end surface 77 of the lever 80 engages when the lever is in locking position. The surface 77 is concentric with the axis of the stud 78 on which the trigger rocks. The trigger has a recess 79 in its peripheral surface into which the free end of the lever 80 drops when the trigger is moved counter-clockwise from the position shown in FIG. 1. The spring 84 is not as strong as the springs of the wind-up mechanism; and so, when the trigger is tripped, the springs of the wind-up mechanism will drive the sprocket, causing the tooth 83, that is in engagement with the shoulder 82 of the lever 80, to kick the lever 80 out of the way to permit the sprocket to revolve. The trigger is returned to normal locking position by operation of the coil spring 90, which is wrapped around the pivot pin of the lever and which engages at one end against the pin 86 and at its opposite end against a pin 91 that is carried by the trigger.

For flash light pictures, as stated, it is desirable to time the flash so that its peak synchronizes with the full opening of the shutter. Since the time of full opening of the shutter varies with different speed settings of the shutter mechanism, it is desirable, then, that the time of tripping of the flash bulb vary with the speed setting to get optimum flash effect at all the different shutter speeds. This result is achieved with the mechanism of the present invention.

Mounted in position to be engaged by the teeth 83 of the sprocket wheel 58 as it rotates are two L-shaped conductor plates or straps 117 and 121. These straps are insulated from the lens casing and are riveted thereto by rivets 118, 122, respectively, made of nylon or other suitable insulating material. The conductor strap 117 has a free end 119 bent upwardly for engagement with and contact by the teeth 83 of the sprocket; and similarly the strap 121 has a bent-up portion 123 which is adapted to be engaged by the teeth 83 of the sprocket. The bent-up portions 119 and 123 are spaced apart angularly about the axis of the sprocket 58 a distance which is greater than but not an exact multiple of the pitch of the teeth 83 of the sprocket, so that the bent-up portions of the two conductors are engaged, respectively, by different teeth 83 of the sprocket wheel 58 after, respectively, different amounts of rotation of the sprocket wheel.

When an "F" or an "X" type flash lamp is used with the camera it is connected, as will be described further hereinafter, so that it will be tripped when a tooth 83 of the sprocket 58 contacts the portion 123 of strap or switch plate 121. When an "M" type flash lamp is used with the camera it is connected, as will be described further hereinafter, so that it will be tripped when a tooth 83 of the sprocket contacts the portion 119 of strap or switch plate 117. The amount of delay that occurs before firing of the "M" type flash lamps is controlled as in the shutter of my Patent No. 2,895,391 by the speed of movement of the sprocket itself once the trigger is tripped to release the sprocket.

It will be noted that the bent-up portion 123 of the strap 121 is positioned considerably further angularly away from a tooth 83 of the sprocket in the locked up position of the sprocket than is the contact portion 119 of the strap 117. The contact portion 123 is positioned to make contact, when the shutter is fully opened; while the contact portion 119 is positioned to make contact as soon as possible after the shutter is tripped. This is because the type "F" and "X" flash lamps have a very much shorter delay before peak illumination than do the "M" type flash lamps. In fact, "X" type lamps reach peak illumination instantaneously. Therefore, the "F" and "X" type lamps do not require an adjustable timing of their contact 123 to be within the usable peak illumination regardless of the shutter speed settings.

The time of operation of the flash with reference to the opening of the shutter is determined as in my prior Patent No. 2,895,391 by a time delay mechanism comprising a lever 96, pinion 101, star wheel 106, and escapement or pallet 107. When the lever 80 is rocked out of engagement with a tooth 83 of the sprocket, the pin 85, which is carried by the tail of the lever, engages and rocks the lever arm 96. This arm 96 is pivoted on the same stud 81 as lever 80, and is formed with a gear segment 100 which meshes with a pinion 101 that rotates on a fixed stud. The pinion 101 is integral with a spur gear 103 that in turn meshes with a pinion which is also rotatable on a fixed stud, and that is integral with a star wheel 106. The star wheel 106 engages a pivotally mounted escapement or pallet 107.

It is desirable that the shutter operating mechanism be adjustable so that the shutter may be opened for longer or shorter periods depending upon the subject and the picture-taking conditions. To vary the speed of opening and closing of the shutter a speed-setting ring 130 (FIG. 1) is provided, as described in Patent No. 2,895,391.

In the shutter illustrated in the present application, as in the shutter of my Patent No. 2,895,391, there may be three separate timing trains, which singly or in combination determine the speed of operation of the shutter.

One of these trains comprises an arm or dog 145 that is pivotally mounted on the mechanism plate 24. This arm or dog has a ledge portion 147 which is adapted to be engaged by a tooth 83 of the sprocket as the sprocket rotates. The arm 145 is constantly urged into position to be engaged by a tooth of the sprocket by a coil spring 148. This timing train includes the dog 145, the spur gear 154, a spur pinion coaxial with and connected to spur gear 154, a spur gear 156 meshing with said pinion, the spur pinion 158 which meshes with gear 156, the star wheel 160 which is coaxial with and secured to pinion 158, and a pallet or escapement 161 which engages the star wheel as illustrated in Patent No. 2,895,391. This timing train operates as in the Patent No. 2,895,391, namely, as the drive gear runs down, the dog 145 is engaged, the instant of engagement depending upon the setting of the timing ring. As the dog 145 swings in an arc it rotates the train of gearing 145, 154, 156, 158, 160, to cause the teeth of the star wheel 160 to rock the pallet or escapement 161. This applies a braking action to the sprocket thereby retarding the closing of the shutter leaves.

The two other retarding trains of the shutter are shown fragmentarily in FIG. 1, parts of one train being denoted at 190, 193, 197 and 198; and parts of the other train being denoted at 210, and 219.

The shutter may be manually opened and closed, by moving a lever 280 (FIG. 1). The diaphragm opening may be set by setting lever 285. The so-called "press-focusing" and the setting of the diaphragm may be effected in the same manner as described in my prior Patent No. 2,701,992, granted February 15, 1955.

Figure 6:
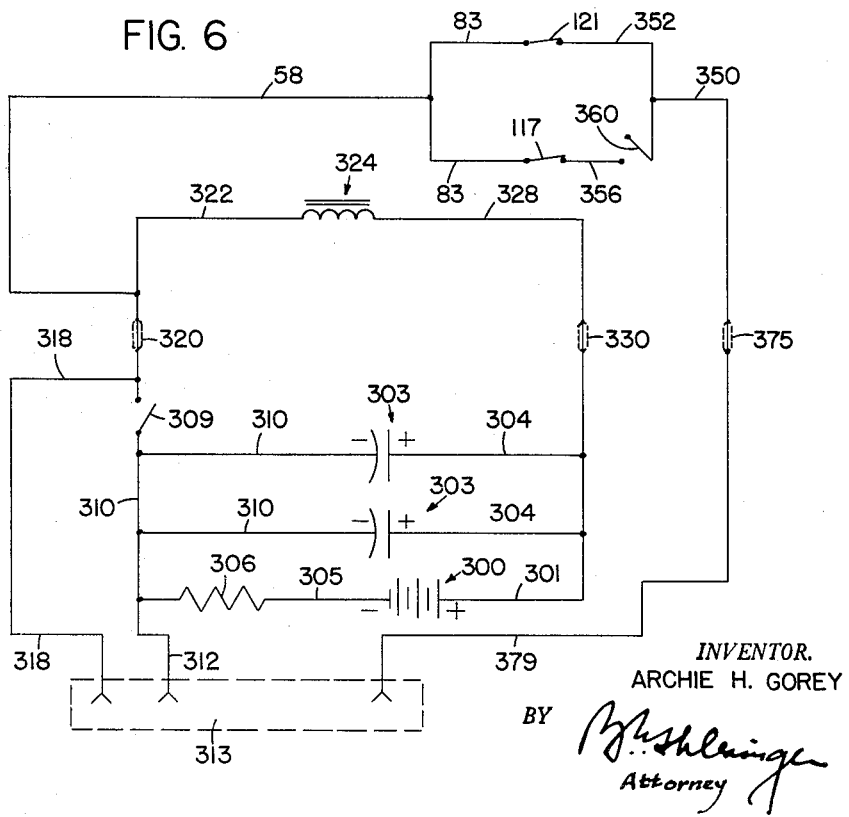
FIG. 6 is an electrical wiring diagram of the camera.

The flash lamp is adapted to be mounted in conventional maner in a holder which is secured to one side of the camera. The trigger 75 is adapted to be tripped electrically by energizing a solenoid 324 (FIGS. 1, 5 and 6). Energy for firing the flash lamp and for actuating the solenoid is obtained from batteries 300 mounted on the back of the camera, and from a pair of capacitors or condensers 303 also mounted on the back of the camera and connected in parallel with the batteries 300. The positive terminal of one of the batteries is connected by a line 301 with a terminal plate 302 with which both capacitors are connected by lines 304. The negative terminal of the other battery is connected by a line 305, resistor 306, and plate 307 with one terminal 308 of a conventional manually-operated switch 309 also mounted on the back of the camera. The capacitors are connected with this same terminal 308 by lines 310. This terminal 308 is connected by conductor strap 311 and a line 312 with a socket or receptacle 313 on the side of the camera, into which the flash lamp holder is plugged. The other terminal 315 of this switch is connected by plate 316 and conductor strap 317 with a line 320 which is encased in the bellows 321 of the camera. The line 320 is connected at its front end both to a line 322 and to a terminal 323. The line 322 is mounted on the back of the lens board 325 of the camera and is connected to a pin or prong 326. The solenoid 324 is plugged to this pin 326 and to a companion pin 327. The pin 327 is connected to a line 328 mounted on the back of the lens board 325. This line is connected by a line 330, also enclosed in the bellows, with a strap 332 which connects to the plate 302.

When the switch 309 is closed, therefore, the solenoid 324 is energized. This solenoid is enclosed within the camera casing 331, and is connected by its armature 333 (FIGS. 1 and 2) and the pin 334, which is carried by the armature, with a bell-crank 335 which is pivotally mounted by means of pin 336 in the camera casing. This bell-crank has a catch or ledge portion 337 which engages over a lug 338 formed on the block 339 which is threaded on a rod 340. The rod 340 slides in guides in the lens board 325. It is of reduced diameter adjacent its upper end so that it is formed with a head 341 and shoulder 342. The rod 340 is adapted to operate a puller 343 which has a projection 344 thereon, that extends through a slot in the lens board and is positioned to engage the roller 345 of the trigger 75. When the solenoid 324 is energized, the rod 340 is pulled down by the bellcrank 335, and the trigger is tripped. As soon as the solenoid is deenergized, the trigger is released through action of the spring 346, which sourrounds the armature of the solenoid.

As previously stated, the line 320 is connected not only to the line 322, but to a terminal 323 (FIG. 5). This terminal is a grounded post on the shutter housing 348 (FIG. 2) which is, of course, grounded to the camera casing. Mounted on an insulating plate 359 (FIGS. 4 and 5), that is secured to the lens board 325, is a conductor plate 350. Conductor plate 350 is of right angular shape and is seated in a correspondingly shaped recess in insulating plate 359. It is connected by a terminal 377 (FIG. 5) with a line 375 that extends through the bellows 321, and that is connected by a contact strap 378 and a line 379 with block 313. The strap or switch plate 121 is directly connected to the plate 350 by a wire 352 (FIG. 3) which extends through an opening in the lens board and is soldered or otherwise connected to a plate or strap 354, that is connected electrically to the plate 350 by a contact button 353.

Figure 4:
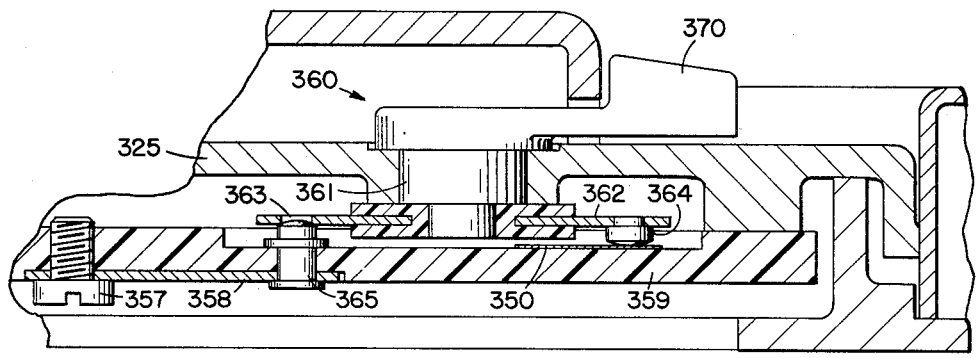
FIG. 4 is a fragmentary sectional view on an enlarged scale, taken on the line 4—4 of FIG. 3 and looking in the direction of the arrows and showing particularly the switch for switching from one type of flash lamp to another.

The other strap or switch plate 117 is connected by a line 356 to a plate or strap 358 (FIGS. 3 and 4). Plate or strap 358 is secured to the insulating board 359 by a screw 357.

A switch 360 is pivotally mounted by means of a journal portion 361 (FIG. 4) in the lens board. It determines whether switch plate 117 will be in circuit with the flash lamp when a tooth 83 of the sprocket engages the switch plate, or whether the sprocket tooth will ride idly over this switch plate, and it will not be until another tooth 83 of the sprocket engages the ledge 123 (FIG. 3) of switch plate 121 that the lamp will be fired. If the switch plate 117 is in the circuit it will, of course, fire the lamp. If the switch plate 117 fires the lamp, then, when a tooth 83 of the sprocket subsequently engages ledge 123, as the shutter runs down, nothing will happen because the lamp will have already been fired. It is only when the switch plate 117 is out of circuit that a lamp will be fired by the switch plate 121. Switch 360 has secured to it a conducting plate 362. This plate carries a contact button 364, which in either position of the switch 360 engages the conductor plate 350. The plate 362 has a hole 363 in it which is diametrically opposite pin 364 and which, in one position of plate 362 engages contact pin 365 that is soldered in plate 358.

In the position of the switch shown in FIGS. 3 and 4, the plate 358 and the strap or switch plate 117 are connected electrically with the plate 350 and the battery. In this position of the switch 360, the circuit to the flash lamp will be closed, then, when a tooth of the sprocket contacts the strap 117.

The strap 121 is always in circuit, but the flash lamp is not fired, of course, through contact of a tooth of the sprocket wheel with this strap unless the strap 117 is out of circuit. In the other position of the switch 360, hole 363 will be disengaged from pin 365, and switch plate 117 will be out of circuit. Switch plate 121 will remain in circuit, however, through line 352, contact plate 354 and conductor plate 350. As soon as a tooth 83 of the sprocket 58 contacts ledge 123 of plate 121, then, the flash lamp will be fired. The sprocket may be grounded to the camera casing.

The switch 360 can be rotated to throw the strap 117 out of circuit by rotating the switch plate through pushing manually on the arm 370 which is secured thereto. The lens board may be provided with graduations "X" and "M", as shown in FIG. 1, to indicate the positions to which the switch 360 may be adjusted.

In use, the photographer puts the flash lamp, which he wants to use, in its holder, plugs the holder to the socket block 313 (FIG. 5), and sets the switch arm 370 to the position shown in FIGS. 1 and 3, if an "M" type flash lamp is being used, or to a position at 90° clockwise therefrom, if an "F" or an "X" type flash lamp is being used. He cocks the shutter in conventional manner by rotating the winding knob 40. When he wants to take a picture, he presses either the switch 309 (FIG. 5), or a switch on the flash lamp holder; or, if he is using a conventional flash lamp holder into which a remote control cord can be plugged, he can press the switch carried by that cord. These two last-named switches will be, of course, in parallel with switch 309. The tripping of the switch closes the circuit to solenoid 324, tripping trigger 75. The locking lever 80 is thereupon disengaged from the sprocket wheel 58, and the sprocket wheel runs down. If the switch 360 is in the position shown in FIGS. 1 and 3, the flash lamp will be fired when a tooth 83 of the sprocket engages the portion 119 of plate 117. The time delay train 96–107 determines, in conventional manner the amount of delay from the time of contact of the tooth with the portion 119 of contact 117 to the full opening of the shutter. This delay is automatically adjusted in the manner described in my Patent No. 2,895,391 upon adjustment of the speed setting ring 130. If the switch 360 is at right angles clockwise from the position shown in FIGS. 1 and 3, that is, at the "X" position, switch plate 117 will be disconnected from the circuit, and only switch plate 121 will be in circuit. When the trigger is tripped, then, the tooth of the sprocket nearest plate 117 will ride idly over contact portion 119 of plate 117, and it will not be until another tooth 83 of the sprocket contacts ledge 123 of plate 121 that the flash lamp will be fired.

One notable feature of the camera shown is that when the lens board 325 is assembled to the housing 348 the lug 338 will engage directly with the catch 337, ready for actuation. No fitting and no outside connection is required. The parts are in position and connected ready to actuate the shutter upon energization of the solenoid 324.

While the invention has been described in connection with a specific embodiment thereof, it will be understood thta it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In a photographic camera, the combination with a between-the-lens shutter having a movable leaf, an electrically-conductive rotary toothed wheel having a plurality of teeth equispaced angularly about its axis, means connected to said wheel to open and close said shutter leaf on rotation of said wheel, trigger-releasable means for holding said wheel against rotation, a trigger for releasing said holding means, and a pair of conductors positioned in angularly-spaced relation about the axis of said wheel, said conductors being spaced apart an angular distance which is greater than but not an exact multiple of the pitch of the teeth of said wheel whereby when said wheel is at rest one of said conductors is spaced further from the next following tooth of said wheel than the other of said conductors is spaced from the tooth of the wheel which next follows it, whereby said conductors are engaged, respectively, by different teeth of said wheel after, respectively, different amounts of rotation of said wheel, of a flash lamp socket, means electrically connecting said one conductor to said flash lamp socket, and switch means movable from a first position to a second position for selectively connecting and disconnecting, respectively, said other conductor to said flash lamp socket, whereby a flash lamp is fired through said one conductor, if said switch means is in its second position, when a tooth of said wheel contacts said one conductor, and a flash lamp is fired through said other conductor, if said switch means is in its first position, when a tooth of said wheel contacts said other conductor.

2. In a photographic camera, the combination of a between-the-lens shutter having a movable leaf, an electrically-conductive rotary toothed wheel having a plurality of teeth equispaced angularly about its axis, means connected to said wheel to open and close said shutter leaf on rotation of said wheel, trigger-releasable means for holding said wheel against rotation, a trigger for releasing said holding means, and a pair of conductors positioned in angularly-spaced relation about the axis of said wheel, said conductors being spaced apart an angular distance which is greater than but not an exact multiple of the pitch of the teeth of said wheel, whereby when said wheel is at rest one of said conductors is spaced further from the next following tooth of said wheel than the other of said conductors is spaced from the next following tooth to it, whereby said conductors are engaged, respectively, by different teeth of said wheel after, respectively, different amounts of rotation of said wheel, of a flash lamp socket, and switch means for selectively determining which conductor will be connected electrically to said socket to fire a flash lamp when the teeth of said wheel contact said conductors.

3. A photographic camera having a between-the-lens shutter comprising a movable leaf, an electrically-conductive rotary toothed wheel having a plurality of teeth equispaced angularly about its axis, means connected to said wheel to open and close said shutter leaf on rotation of said wheel, trigger-releasable means for holding said wheel against rotation, a trigger for releasing said holding means, and a pair of conductors positioned in angularly-spaced relation about the axis of said wheel, said conductors being spaced apart an angular distance which is greater than but not an exact multiple of the pitch of the teeth of said wheel whereby when said wheel is at rest one of said conductors is spaced further from the next following tooth of said wheel than the other of said conductors is spaced from the tooth of the wheel which next follows it, a flash lamp socket, means electrically conecting said one conductor to said flash lamp socket, switch means movable from a first position to a second position for selectively connecting and disconnecting, respectively, said other conductor to said flash lamp socket, whereby a flash lamp is fired through said one conductor, if said switch means is in its second position, when a tooth of said wheel contacts said one conductor, and a flash lamp is fired through said other conductor, if said switch means is in its first position, when a tooth of said wheel contacts said other conductor, a solenoid, means connecting said solenoid to said trigger to actuate said trigger when said solenoid is energized, a source of electric energy, and a single manually-operated switch for connecting said source of electric energy to said solenoid and to said wheel.

4. A photographic camera as claimed in claim 3 wherein said camera has a lens board, a bellows connecting said lens board with the back of said camera, said shutter is mounted on said lens board, and the means connecting said source of electric energy to said solenoid and to said wheel comprises an electrical conductor embedded in said bellows.

References Cited in the file of this patent

UNITED STATES PATENTS 2,319,086     Riddell _____ May 11, 1943